United States Patent
Bogue

(10) Patent No.: US 9,951,642 B2
(45) Date of Patent: Apr. 24, 2018

(54) INTERMITTENT GROOVED SOFT ABRADABLE MATERIAL TO REDUCE BLADE TIP TEMPERATURE

(71) Applicant: United Technologies Corporation, Hartford, CT (US)

(72) Inventor: William Bogue, Hebron, CT (US)

(73) Assignee: United Technologies Corporation, Hartford, CT (US)

( * ) Notice: Subject to any disclaimer, the term of this patent is extended or adjusted under 35 U.S.C. 154(b) by 301 days.

(21) Appl. No.: 14/707,831

(22) Filed: May 8, 2015

(65) Prior Publication Data

US 2016/0326899 A1  Nov. 10, 2016

(51) Int. Cl.
*F01D 11/12* (2006.01)
*F04D 29/32* (2006.01)
*F04D 29/52* (2006.01)
*F04D 29/02* (2006.01)

(52) U.S. Cl.
CPC .......... *F01D 11/122* (2013.01); *F04D 29/023* (2013.01); *F04D 29/324* (2013.01); *F04D 29/526* (2013.01); *F05D 2220/36* (2013.01); *F05D 2250/15* (2013.01); *F05D 2250/184* (2013.01); *F05D 2250/25* (2013.01); *F05D 2250/293* (2013.01)

(58) Field of Classification Search
CPC .......... F01D 11/00; F01D 11/08; F01D 11/12; F01D 11/125; F01D 11/122; F01D 5/20; F05D 2220/36; F05D 2220/15; F05D 2220/184; F05D 2220/25; F05D 2220/293

USPC ............................................. 415/173.4, 174.4
See application file for complete search history.

(56) References Cited

U.S. PATENT DOCUMENTS

| | | | | |
|---|---|---|---|---|
| 5,388,959 A | * | 2/1995 | Forrester | F01D 11/122 415/173.4 |
| 6,350,102 B1 | * | 2/2002 | Bailey | F01D 5/20 415/173.5 |
| 6,457,939 B2 | * | 10/2002 | Ghasripoor | F01D 11/122 29/889.2 |
| 6,830,428 B2 | * | 12/2004 | Le Biez | F01D 5/20 415/173.4 |

(Continued)

FOREIGN PATENT DOCUMENTS

| | | |
|---|---|---|
| DE | 102007053135 | 5/2009 |
| EP | 2687684 | 1/2014 |
| WO | 2011053448 | 5/2011 |

OTHER PUBLICATIONS

Extended European Search Report dated Sep. 16, 2016 in European Application No. 16168512.8.

(Continued)

*Primary Examiner* — Igor Kershteyn
*Assistant Examiner* — Eric Zamora Alvarez
(74) *Attorney, Agent, or Firm* — Snell & Wilmer L.L.P.

(57) ABSTRACT

An abradable material includes a matrix material defining pockets of fluid. The abradable material also includes an outer surface configured to be coupled to an interior surface of a fan case such that in response to the outer surface being coupled to the fan case, the abradable material is positioned circumferentially about an axis The abradable material also includes an inner surface defining a circumferential ridge and a circumferential groove.

18 Claims, 6 Drawing Sheets

(56) References Cited

U.S. PATENT DOCUMENTS

| 7,614,847 B2* | 11/2009 | Nelson | F01D 11/12 |
| | | | 415/173.4 |
| 9,249,680 B2* | 2/2016 | Lee | F01D 11/122 |
| 2007/0147989 A1* | 6/2007 | Collins | F01D 11/02 |
| | | | 415/173.1 |
| 2013/0071234 A1* | 3/2013 | Dimelow | F04D 29/526 |
| | | | 415/173.4 |
| 2013/0149163 A1* | 6/2013 | Parkos, Jr. | F01D 5/20 |
| | | | 416/224 |

OTHER PUBLICATIONS

Communication Pursuant to Article 94(3) EPC dated Nov. 14, 2017 in European Application No. 16168512.8.

* cited by examiner

INTERMITTENT GROOVED SOFT ABRADABLE MATERIAL TO REDUCE BLADE TIP TEMPERATURE

FIELD

The present disclosure relates generally to a fan section of a gas turbine engine and, more particularly, to an abradable material coupled to an interior of a fan case.

BACKGROUND

Gas turbine engines typically include a fan section that propels air aft where it is divided into a core airflow to be received by a compressor section of the gas turbine engine and a bypass airflow to provide propulsion for the gas turbine engine. The fan section includes a plurality of fan blades capable of rotation about an axis and a fan case circumferentially surrounding the plurality of fan blades. During certain events, the fan blades can move relative to the fan case and rub may occur between the fan blades and the fan case. To reduce the likelihood of damage to the fan blades or the fan case, the clearance between the fan blades and the fan case can be increased, however this comes at the expense of reducing performance and tip stability. Instead, an interior surface of the fan case includes a strip or a layer of abradable material. The use of an abradable material is desirable as it can absorb intermittent blade excursions by locally exfoliating material associated with the rub event. This local exfoliation allows for tip clearances to be maintained tighter away from the zone of the excursion and, thus, minimize the effects on engine performance. These rub events, however, generate heat which may increase the temperature of the interface of the fan blades and the abradable material, which may adversely affect the fan blades and/or the abradable material.

SUMMARY

What is described is an abradable material for use in a fan section of a gas turbine engine. The abradable material includes a matrix material defining pockets of fluid. The abradable material also includes an outer surface configured to be coupled to an interior surface of a fan case such that in response to the outer surface being coupled to the fan case, the abradable material is positioned circumferentially about an axis. The abradable material also includes an inner surface defining a circumferential ridge and a circumferential groove.

In any of the foregoing abradable materials, the circumferential groove may additionally and/or alternatively include an annular groove.

In any of the foregoing abradable materials, the circumferential groove may additionally and/or alternatively include a helical groove.

In any of the foregoing abradable materials, in response to a piece of the abradable material becoming exfoliated during rotation of the rotating blade, the piece of the abradable material may additionally and/or alternatively be ejected from the section of the gas turbine engine via the helical groove.

In any of the foregoing abradable materials, an axial cross section of the inner surface may additionally and/or alternatively define a rounded wave.

In any of the foregoing abradable materials, the rotating blade may additionally and/or alternatively include a fan blade and the fan case may additionally and/or alternatively include a fan case.

In any of the foregoing abradable materials, the circumferential ridge may additionally and/or alternatively be asymmetric about an apex of the circumferential ridge.

Also described is a system. The system includes a fan blade configured to rotate about an axis. The system also includes a fan case circumferentially surrounding the fan blade and having an interior surface. The system also includes an abradable material having an outer surface coupled to the interior surface such that the abradable material is positioned circumferentially about the axis and an inner surface defining a circumferential ridge and a circumferential groove.

In any of the foregoing systems, the circumferential groove may additionally and/or alternatively include an annular groove.

In any of the foregoing systems, the circumferential groove may additionally and/or alternatively include a helical groove.

In any of the foregoing systems, in response to a piece of the abradable material becoming exfoliated during rotation of the rotating blade, the piece of the abradable material may additionally and/or alternatively be ejected from the section of the gas turbine engine via the helical groove.

In any of the foregoing systems, an axial cross section of the inner surface may additionally and/or alternatively define a rounded wave.

In any of the foregoing systems, the circumferential ridge and the circumferential groove may, additionally and/or alternatively, be designed such that, in in response to contact between the fan blade and the abradable material, an angle of incidence between an engine central longitudinal axis and a line tangential to a point of contact between the rotating blade and the abradable material is less than forty-five degrees.

In any of the foregoing systems, the circumferential ridge may additionally and/or alternatively be asymmetric about an apex of the circumferential ridge.

In any of the foregoing systems, the fan blade may additionally and/or alternatively comprise at least one of an aluminum or an aluminum alloy.

In any of the foregoing systems, in response to contact between the fan blade and the abradable material, the fan blade may additionally and/or alternatively contact the abradable material nearer the circumferential ridge than the circumferential groove.

In any of the foregoing systems, in response to contact between the fan blade and the abradable material, heat may additionally and/or alternatively be generated at a point of contact between an outer diameter edge of the fan blade and the inner surface and is dissipated by the fan blade at areas of the outer diameter edge that are not in contact with the inner surface.

Also described is a fan section of a gas turbine engine. The fan section includes a fan blade configured to rotate about an axis and having an outer diameter edge. The fan section also includes a fan case circumferentially surrounding the fan blade and having an interior surface. The fan section also includes an abradable material having an outer surface coupled to the interior surface such that the abradable material is positioned circumferentially about the axis and a circumferentially corrugated inner surface.

In any of the foregoing fan sections, an axial cross section of the inner surface may additionally and/or alternatively define a rounded wave.

In any of the foregoing fan sections, in response to contact between the fan blade and the abradable material, heat may additionally and/or alternatively be generated at a point of contact between the outer diameter edge of the fan blade and the circumferentially corrugated inner surface and is dissipated by the fan blade at areas of the outer diameter edge that are not in contact with the circumferentially corrugated inner surface.

The foregoing features and elements are to be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

The subject matter of the present disclosure is particularly pointed out and distinctly claimed in the concluding portion of the specification. A more complete understanding of the present disclosure, however, is best obtained by referring to the detailed description and claims when considered in connection with the drawing figures, wherein like numerals denote like elements.

DETAILED DESCRIPTION

Figure 1:
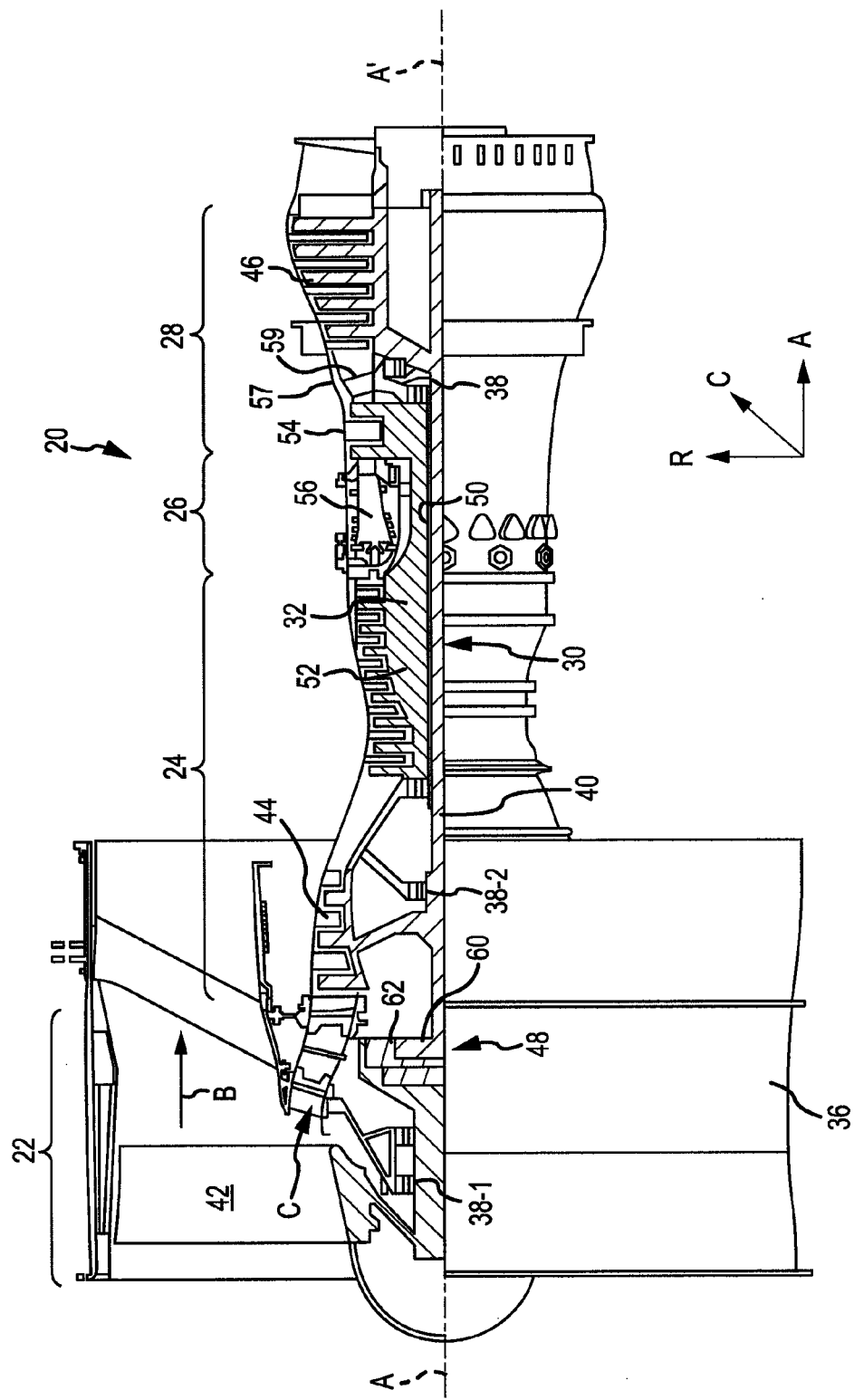
FIG. 1 illustrates a cross-sectional view of an exemplary gas turbine engine, in accordance with various embodiments.

With reference to FIG. 1, a gas turbine engine 20 is provided. An A-R-C axis illustrated in each of the figures illustrates the axial (A), radial (R) and circumferential (C) directions. As used herein, "aft" refers to the direction associated with the tail (e.g., the back end) of an aircraft, or generally, to the direction of exhaust of the gas turbine engine. As used herein, "forward" refers to the direction associated with the nose (e.g., the front end) of an aircraft, or generally, to the direction of flight or motion. As utilized herein, radially inward refers to the negative R direction and radially outward refers to the R direction.

Gas turbine engine 20 can be a two-spool turbofan that generally incorporates a fan section 22, a compressor section 24, a combustor section 26 and a turbine section 28. Alternative engines include an augmentor section among other systems or features. In operation, fan section 22 drives coolant along a bypass flow-path B while compressor section 24 drives coolant along a core flow-path C for compression and communication into combustor section 26 then expansion through turbine section 28. Although depicted as a turbofan gas turbine engine 20 herein, it should be understood that the concepts described herein are not limited to use with turbofans as the teachings can be applied to other types of turbine engines including three-spool architectures.

Gas turbine engine 20 generally comprise a low speed spool 30 and a high speed spool 32 mounted for rotation about an engine central longitudinal axis A-A' relative to an engine static structure 36 via several bearing systems 38, 38-1, and 38-2. It should be understood that various bearing systems 38 at various locations can alternatively or additionally be provided, including for example, bearing system 38, bearing system 38-1, and bearing system 38-2.

Low speed spool 30 generally includes an inner shaft 40 that interconnects a fan 42, a low pressure (or first) compressor section 44 and a low pressure (or first) turbine section 46. Inner shaft 40 is connected to fan 42 through a geared architecture 48 that can drive fan 42 at a lower speed than low speed spool 30. Geared architecture 48 includes a gear assembly 60 enclosed within a gear housing 62. Gear assembly 60 couples inner shaft 40 to a rotating fan structure. High speed spool 32 includes an outer shaft 50 that interconnects a high pressure (or second) compressor section 52 and high pressure (or second) turbine section 54. A combustor 56 is located between high pressure compressor 52 and high pressure turbine 54. A mid-turbine frame 57 of engine static structure 36 is located generally between high pressure turbine 54 and low pressure turbine 46. Mid-turbine frame 57 supports one or more bearing systems 38 in turbine section 28. Inner shaft 40 and outer shaft 50 are concentric and rotate via bearing systems 38 about the engine central longitudinal axis A-A', which is collinear with their longitudinal axes. As used herein, a "high pressure" compressor or turbine experiences a higher pressure than a corresponding "low pressure" compressor or turbine.

The core airflow C is compressed by low pressure compressor section 44 then high pressure compressor 52, mixed and burned with fuel in combustor 56, then expanded over high pressure turbine 54 and low pressure turbine 46. Mid-turbine frame 57 includes airfoils 59 which are in the core airflow path. Turbines 46, 54 rotationally drive the respective low speed spool 30 and high speed spool 32 in response to the expansion.

Gas turbine engine 20 is a high-bypass geared aircraft engine. The bypass ratio of gas turbine engine 20 can be greater than about six (6). The bypass ratio of gas turbine engine 20 can also be greater than ten (10). Geared architecture 48 can be an epicyclic gear train, such as a star gear system (sun gear in meshing engagement with a plurality of star gears supported by a carrier and in meshing engagement with a ring gear) or other gear system. Geared architecture 48 can have a gear reduction ratio of greater than about 2.3 and low pressure turbine 46 can have a pressure ratio that is greater than about five (5). The bypass ratio of gas turbine engine 20 can be greater than about ten (10:1). The diameter of fan 42 can be significantly larger than that of the low pressure compressor section 44, and the low pressure turbine 46 can have a pressure ratio that is greater than about five (5:1). Low pressure turbine 46 pressure ratio is measured prior to inlet of low pressure turbine 46 as related to the pressure at the outlet of low pressure turbine 46 prior to an exhaust nozzle. It should be understood, however, that the above parameters are exemplary of particular embodiments of a suitable geared architecture engine and that the present disclosure contemplates other turbine engines including direct drive turbofans.

The next generation of turbofan engines are designed for higher efficiency and use higher pressure ratios and higher temperatures in high pressure compressor 52 than are conventionally experienced. These higher operating temperatures and pressure ratios create operating environments that cause thermal loads that are higher than the thermal loads conventionally experienced.

Figure 2:
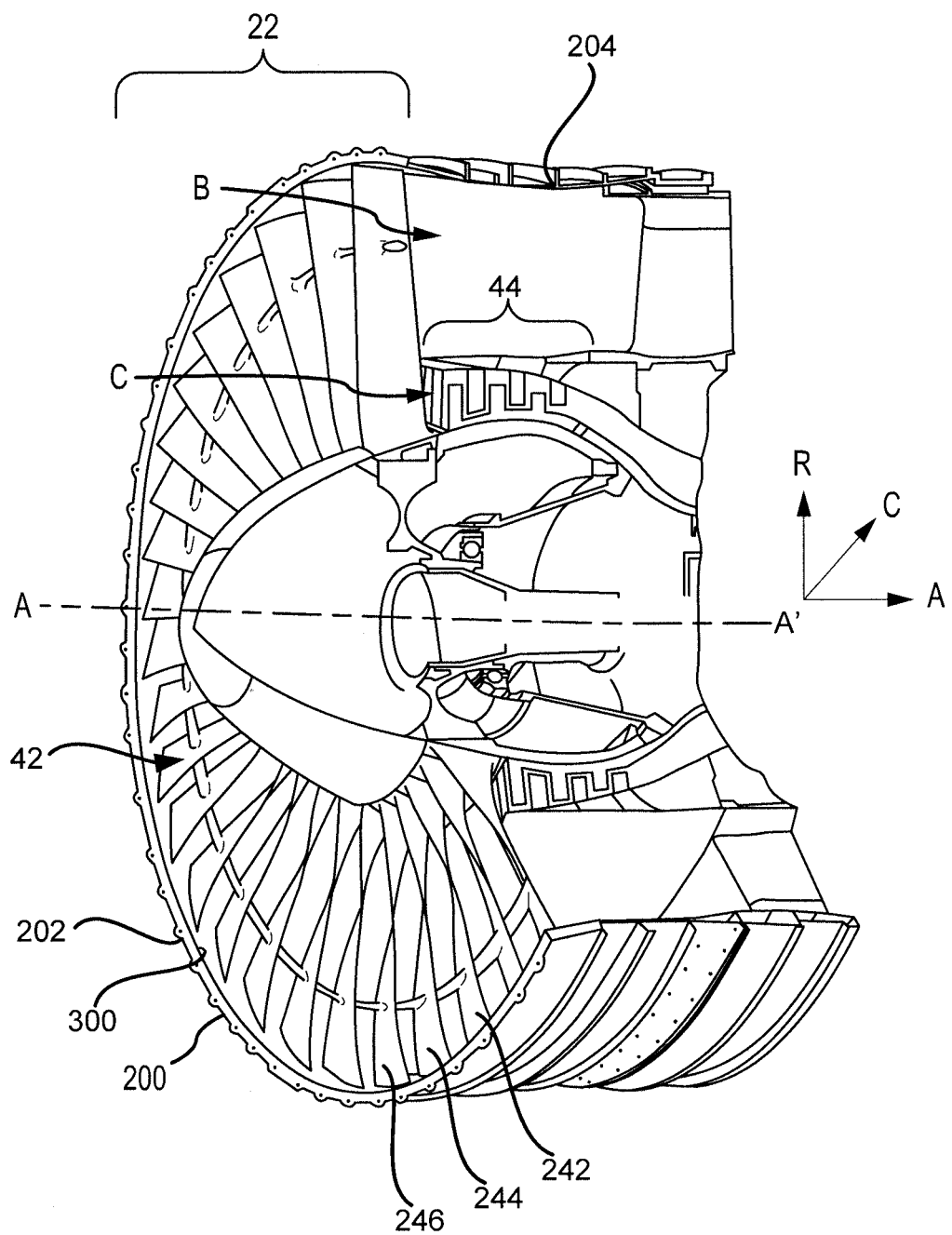
FIG. 2 illustrates a cross-sectional view of a fan section of the gas turbine engine of FIG. 1, in accordance with various embodiments.

With reference now to FIG. 2, fan section 22 includes a fan case 200. Fan 42 includes a plurality of fan blades including fan blade 242, fan blade 244 and fan blade 246 capable of rotation about engine central longitudinal axis A-A'. Bypass flow-path B and core flow-path C are formed by the rotation of fan 42 about engine central longitudinal axis A-A'. Fan case 200 circumferentially surrounds fan 42.

Fan case 200 includes a leading edge 202 and forms a conic shape having a vertex 204. Accordingly, a diameter at leading edge 202 is greater than a diameter at vertex 204. In that regard and with brief reference to FIG. 1, during a transitory condition (such as a maneuver of gas turbine engine 20), fan 42 can move in a forward direction relative to fan case 200. At the end of the high stress event, fan 42 can move aft relative to fan case 200. In response to fan 42 moving aft, fan 42 can be positioned in a different axial position relative to fan case 200 than prior to the stress event. Fan 42 can also move radially relative to fan case 200 during a stress event.

Returning reference to FIG. 2, because fan case 200 includes a conic shape, fan 42 will contact fan case 200 in response to sufficient axial movement of fan 42 relative to fan case 200. Similarly, fan 42 will contact fan case 200 in response to sufficient radial movement of fan 42 relative to fan case 200. To reduce the likelihood of damage during the contact, a radially inner surface of fan case 200 is coupled to or includes an abradable material 300. In response to contact between fan 42 and abradable material 300, pieces of abradable material 300 become exfoliated, reducing the likelihood of damage to fan 42 or fan case 200. With brief reference to FIGS. 2 and 3, the portions of abradable material 300 away from the exfoliated pieces of abradable remain in place and provide tighter blade tip clearance 370, which prevents increasingly reduced performance from wear.

Figure 3:
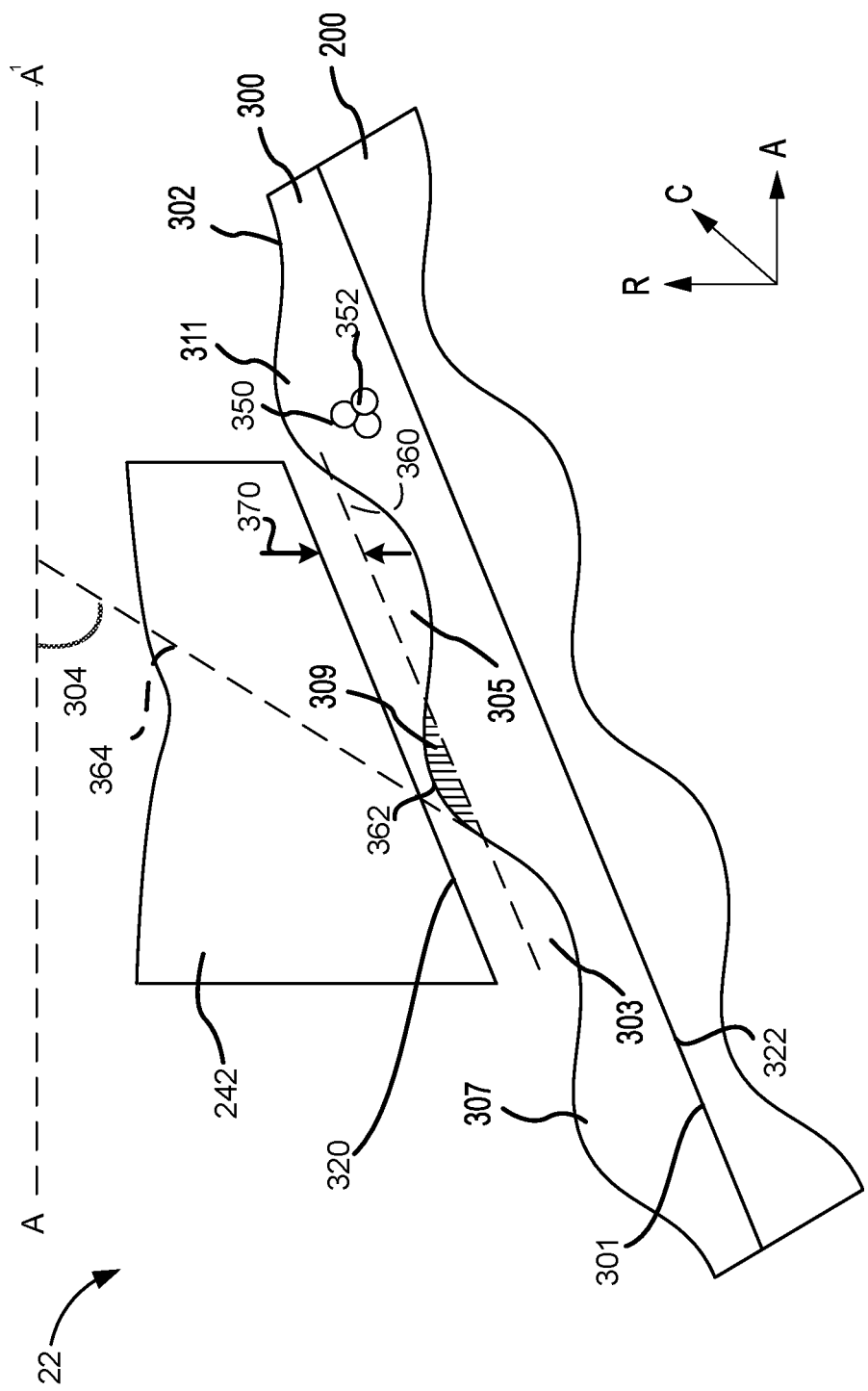
FIG. 3 illustrates a cross-sectional view a fan blade and an abradable material, in accordance with various embodiments.

Abradable material 300 includes a matrix material 350, such as epoxy, glass, rubber, thermoset plastic or the like, surrounding pockets of fluid 352, such as air. The matrix material 350 can include and/or surround microballoons and/or microspheres that encase the pockets of fluid 352. Only 3 pockets of fluid 352 are illustrated in FIG. 3, however abradable material 300 is comprised of matrix material 350 surrounding pockets of fluid 352. The pockets of fluid can have diameters between 1 micrometer ($3.9 \times 10^{-5}$ inches) and 1 millimeter (0.039 inches). In that regard and in response to contact with fan 42, some of the microballoons of abradable material 300 can be exfoliated from the rest of abradable material 300. Accordingly, in response to fan 42 contacting abradable material 300, minimal damage will be caused to fan 42.

In response to fan 42 making contact with abradable material 300, friction between fan 42 and abradable material 300 occurs and generates heat. Fan 42, fan case 200 and/or abradable material 300 can be undesirably affected in response to the heat causing the temperature to reach a predetermined level. The pieces of abradable material 300 that are exfoliated from fan case 200 can have a greater temperature than the ambient surroundings and can be undesirable even if they do not have a higher temperature than the ambient temperature. In that regard, it is desirable for the pieces of abradable material 300 to be ejected from fan section 22 in a timely fashion.

With reference now to FIG. 3, abradable material 300 has an inner surface 302 defining a circumferentially corrugated shape, such as the sinusoidal shape illustrated in FIG. 3, and an outer surface 301 coupled to an interior surface 322 of fan case 200. Where used herein, corrugated refers to any surface having ridges and grooves such that a cross section of inner surface 302 defines a rounded wave (e.g., a sine wave), a squared wave, a triangular wave, or the like. In various embodiments, the wave may be asymmetrical with a shallower side axially forward.

Inner surface 302 defines a plurality of ridges and grooves including ridge 307, ridge 309, ridge 311, groove 303, and groove 305. The ridges and grooves of inner surface 302 are circumferential and can have an axial component as well. Stated differently and with brief reference to FIGS. 2 and 3, the ridges and grooves can be annular in shape about engine central longitudinal axis A-A', helical in shape or the like. In contrast and with renewed reference to FIG. 3, an outer diameter edge 320 of fan blade 242 is straight, indicating that outer diameter edge 320 is smooth (i.e., it includes no ridges or grooves).

During a transitory condition, outer diameter edge 320 of fan blade 242 can contact inner surface 302 of abradable material 300, thus generating friction heat. Due to the ridges and grooves of inner surface 302, less friction heat will be generated between abradable material 300 and fan blade 242. During a contact event, outer diameter edge 320 of fan blade 242 will contact abradable material 300 at intermittent axial locations of inner surface 302. Due to the ridges and grooves of inner surface 302, outer diameter edge 320 of fan blade 242 will contact inner surface 302 at locations closer to the ridges than the grooves. This is because abradable material 300 is designed such that during normal operating stress conditions, outer diameter edge 320 will remain radially closer to the ridges than the grooves. Accordingly, typically no friction heat will be generated between fan blade 242 and abradable material 300 at locations closer to groove 303 and groove 305.

With brief reference to FIGS. 2 and 3, in response to fan blade 242 rotating about engine central longitudinal axis A-A', some of the fluid entering fan section 22 will be received by the grooves. Returning reference to FIG. 3, fan blade 242 can include aluminum and/or aluminum alloys which are relatively conductive. In that regard, in response to outer diameter edge 320 making contact with abradable material 300 closer to the ridges of inner surface 302 than the grooves, friction heat will be generated at these locations. Because of the thermal conductivity of aluminum, the friction heat will be distributed across outer diameter edge 320 to be dissipated by outer diameter edge 320 where outer diameter edge 320 does not contact inner surface 302 and where lower ambient temperatures exist.

During a transitory condition, friction caused by the contact between outer diameter edge 320 and inner surface 302 causes pieces of abradable material 300 to become exfoliated from fan case 200. As previously mentioned, it is desirable for these exfoliated pieces of abradable material 300 to be ejected from fan section 22. In that regard, the ejected pieces of abradable material 300 enter groove 303 and/or groove 305 where they will not contact outer diameter edge 320 of fan blade 242, thus reducing heat applied to outer diameter edge 320. Similarly, temperatures in groove 303 and/or groove 305 are lower than elsewhere in abradable material 300. Thus, the pieces of abradable material 300 are reduced in temperature while positioned within groove 303 and/or groove 305. Similarly, the exfoliated pieces of abradable material 300 can be ejected from fan section 22 in a timely manner based on the shape and design of the grooves.

Figure 4:
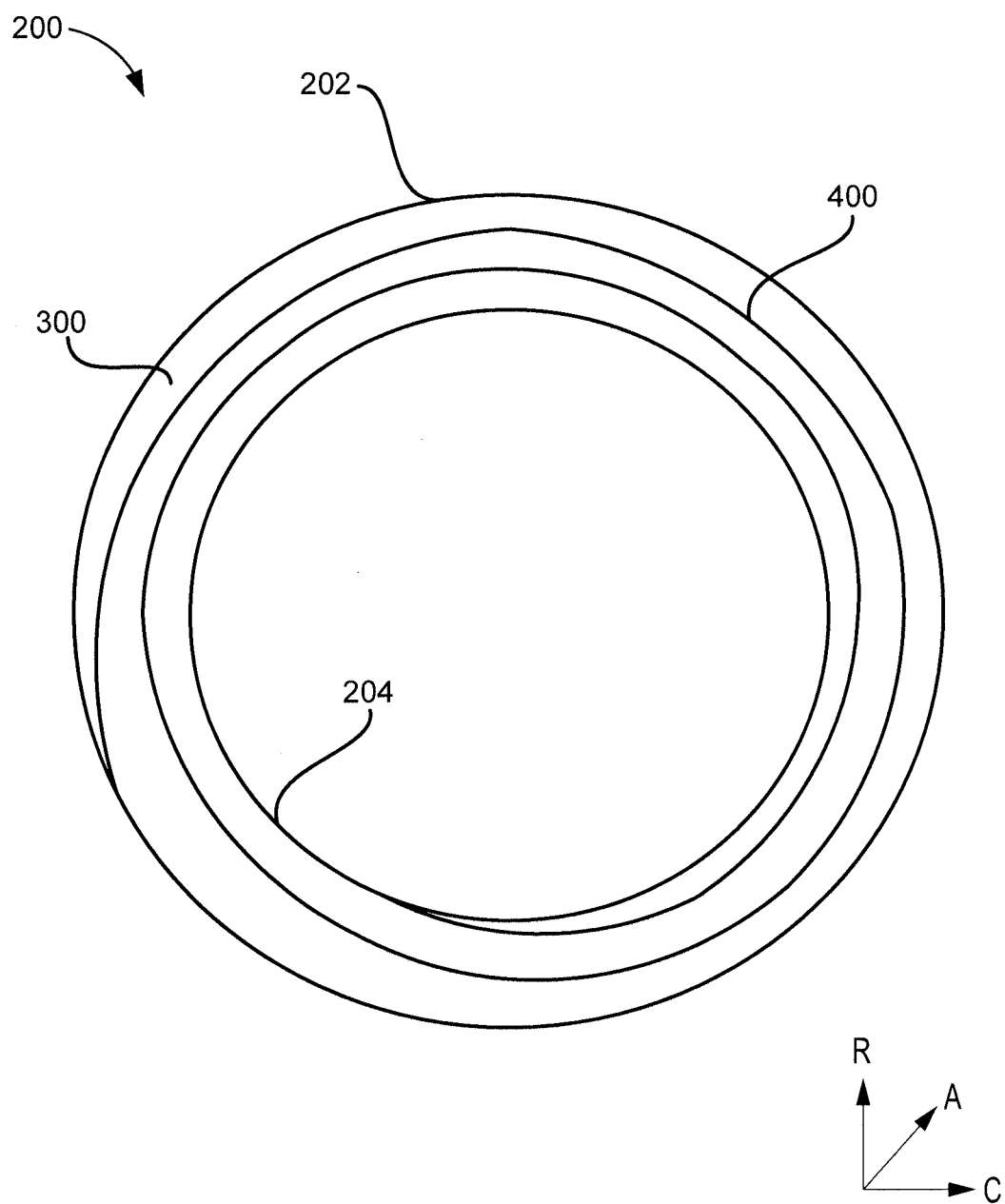
FIG. 4 illustrates an axial view of an abradable material, in accordance with various embodiments.
Figure 5:
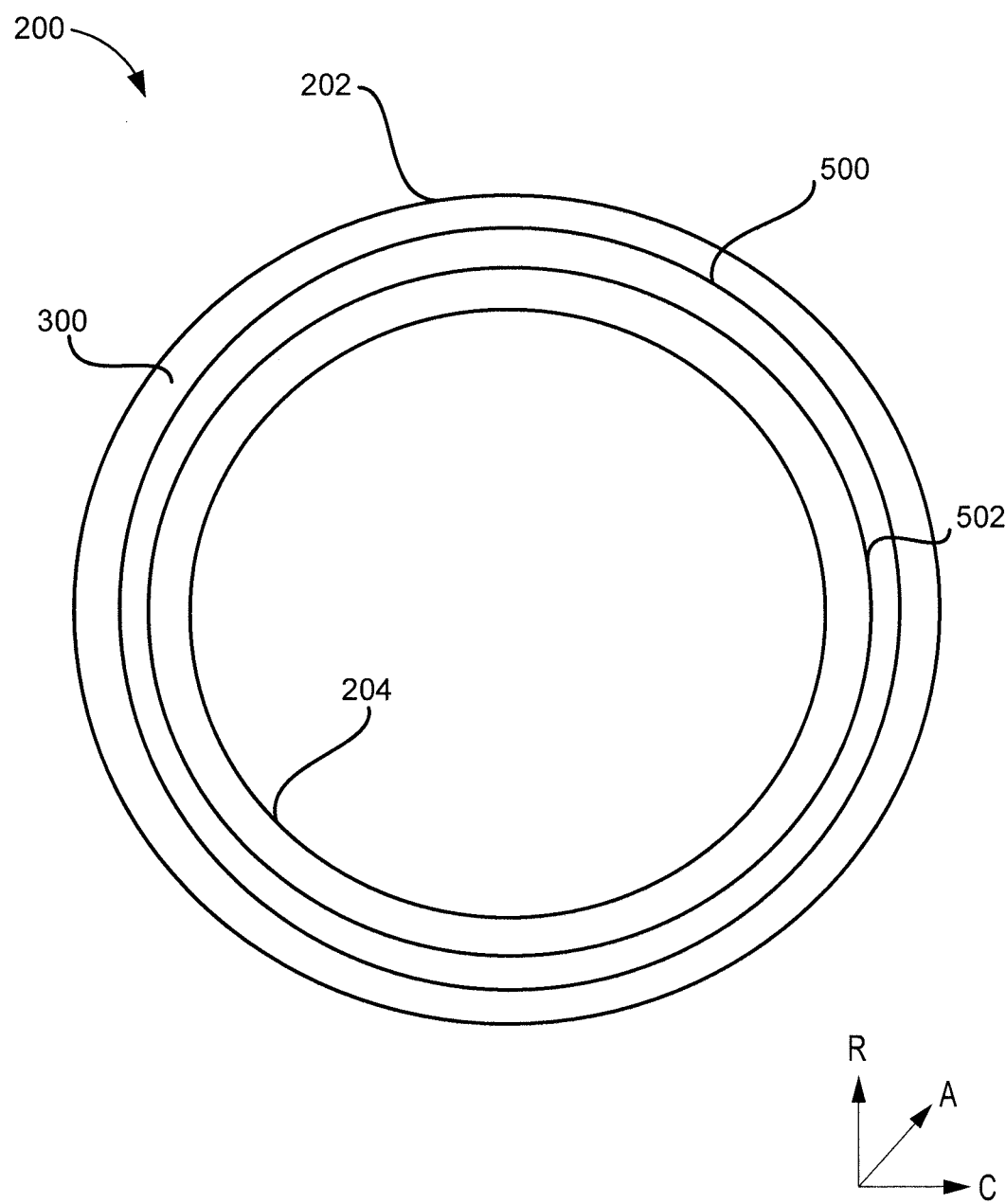
FIG. 5 illustrates an axial view of another abradable material, in accordance with various embodiments.

With reference to FIGS. 2 and 4, the grooves of abradable material 300 can also, or instead, include an axial and a circumferential component, such as a helical groove 400. In response to an exfoliated piece of abradable material entering helical grove 400, the piece of abradable material will move through helical groove 400 until it reaches vertex 204 of fan case 200, where it is then ejected from fan section 22. With reference now to FIGS. 2 and 5, the grooves of abradable material 300 can include a circumferential component without an axial component, such as annular groove 500 and annular groove 502.

With reference to FIGS. 3 and 4, ease of manufacture should be considered when selecting grooves to be utilized within abradable material 300. For example, simple circumferential grooves may be manufactured using a larger variety of methods than helical grooves. Simple circumferential grooves may be manufactured using pre-molding or machining secondarily using a turret lathe or grinding. A helical groove can require more complicated machining processes to control the pitch of the helix and can be more easily manufactured using a set of pre-molded panels.

Returning reference to FIG. 3, outer diameter edge 320 contacts inner surface 302 of abradable material 300 as indicated by line 360. As a result, a portion 362 of ridge 309 is exfoliated from abradable material 300.

A line 364 is tangential to the point of contact between outer diameter edge 320 and inner surface 302. Line 364 forms an angle of incidence 304 with engine central longitudinal axis A-A'. It is desirable for angle of incidence 304 to be less than forty five (45) degrees as the lower angle of incidence 304 is, the less erosion of abradable material 300 occurs. This is because abradables are traditionally affected by incoming erodent (such as ingested debris) which travels predominately parallel to a centerline of the engine at or ahead of the fan blades. If the angle of incidence is head on with the abradable material, material loss from erosion is maximized. Due to the contact between fan blade 242 and abradable material 300 being nearer the ridges than the grooves, angle of incidence 304 remains less than 45 degrees.

Figure 6:
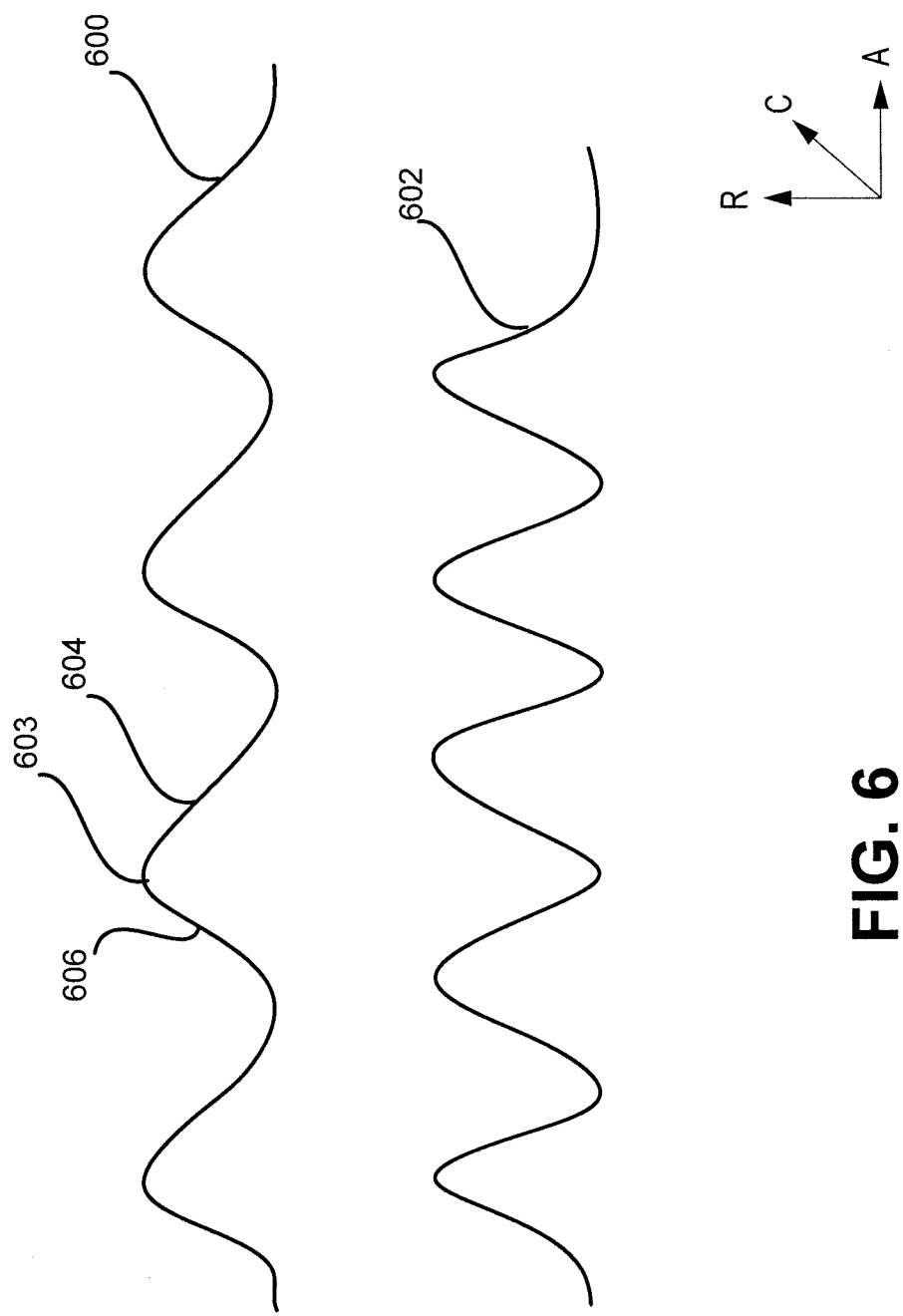
FIG. 6 illustrates an asymmetrical wave and a rounded triangular wave, in accordance with various embodiments.

The material losses due to erosion are greatly reduced when the angle of incidence is less than 45 degrees. Accordingly, rounded waves are preferable to square waves and simple slots. Triangular waves can be used but should be well rounded to prevent unnecessary erosion of material. Similarly, ridge 307, 309 and 311 and groove 303 and 305 need not be symmetrical. For example, a forward side of ridge 307 may be designed shallower than an aft side of ridge 307. With reference now to FIG. 6, a rounded triangular wave 602 includes a substantially triangular shape with rounded edges. An asymmetrical wave 600 includes a steep face 606 on a forward side of ridge 603 and a shallow face 604 on an aft side of ridge 603. Stated differently, ridge 603 is not symmetrical about the apex of ridge 603. This allows for reduced erosion resistance at the forward side while maximizing strength of ridge 603.

Benefits, other advantages, and solutions to problems have been described herein with regard to specific embodiments. The scope of the disclosure, however, is provided in the appended claims.

The invention claimed is:

1. An abradable material for use about a blade configured to rotate about an engine central longitudinal axis of a gas turbine engine, the abradable material comprising:
 a matrix material defining pockets of fluid;
 an outer surface configured to be coupled to an interior surface of a case of the gas turbine engine such that in response to the outer surface being coupled to the case, the abradable material is positioned circumferentially about the engine central longitudinal axis; and
 a grooved inner surface defining a circumferential ridge and a circumferential groove such that in response to contact between the blade and the grooved inner surface of the abradable material, an angle of incidence between the engine central longitudinal axis and any local line tangential to the grooved inner surface of the abradable material is less than forty-five degrees.

2. The abradable material of claim 1, wherein the circumferential groove includes an annular groove.

3. The abradable material of claim 1, wherein the circumferential groove includes a helical groove.

4. The abradable material of claim 3, wherein in response to a piece of the abradable material becoming exfoliated during rotation of the blade, the piece of the abradable material is ejected from the section of the gas turbine engine via the helical groove.

5. The abradable material of claim 1, wherein an axial cross section of the grooved inner surface defines a rounded wave.

6. The abradable material of claim 1, wherein the blade is a fan blade and the case is a fan case.

7. The abradable material of claim 1, wherein the circumferential ridge is asymmetric about an apex of the circumferential ridge.

8. A system comprising:
 a fan blade configured to rotate about an engine central longitudinal axis;
 a fan case circumferentially surrounding the fan blade and having an interior surface; and
 an abradable material having:
   an outer surface coupled to the interior surface such that the abradable material is positioned circumferentially about the engine central longitudinal axis; and
   a grooved inner surface defining a circumferential ridge and a circumferential groove, wherein an angle between the engine central longitudinal axis and any local line tangential to the grooved inner surface of the abradable material is less than forty-five degrees.

9. The system of claim 8, wherein the circumferential groove includes an annular groove.

10. The system of claim 8, wherein the circumferential groove includes a helical groove.

11. The system of claim 10, wherein in response to a piece of the abradable material becoming exfoliated while the fan blade is rotating about the axis, the piece of the abradable material is ejected from the system via the helical groove.

12. The system of claim 8, wherein an axial cross section of the grooved inner surface defines a rounded wave.

13. The system of claim 8, wherein the circumferential ridge is asymmetric about an apex of the circumferential ridge.

14. The system of claim 8, wherein the fan blade comprises at least one of an aluminum or an aluminum alloy.

15. The system of claim 8, wherein in response to contact between the fan blade and the abradable material, heat is generated at a point of contact between an outer diameter edge of the fan blade and the grooved inner surface and is dissipated by the fan blade at areas of the outer diameter edge that are not in contact with the grooved inner surface.

16. A fan section of a gas turbine engine comprising:
 a fan blade configured to rotate about an engine central longitudinal axis and having an outer diameter edge;
 a fan case circumferentially surrounding the fan blade and having an interior surface; and
 an abradable material having:

an outer surface coupled to the interior surface such that the abradable material is positioned circumferentially about the axis; and a circumferentially corrugated inner surface, wherein an angle of incidence between the engine central longitudinal axis and any local line tangential to a point of contact between the fan blade and the circumferentially corrugated inner surface of the abradable material is less than forty-five degrees.

17. The fan section of claim 16, wherein an axial cross section of the circumferentially corrugated inner surface is a rounded wave.

18. The fan section of claim 16, wherein in response to contact between the fan blade and the abradable material, heat is generated at a point of contact between the outer diameter edge of the fan blade and the circumferentially corrugated inner surface and is dissipated by the fan blade at areas of the outer diameter edge that are not in contact with the circumferentially corrugated inner surface.

* * * * *